(12) United States Patent
Zhang et al.

(10) Patent No.: US 10,185,657 B2
(45) Date of Patent: Jan. 22, 2019

(54) METHOD AND SYSTEM FOR OPTIMIZING DETERMINISTIC GARBAGE COLLECTION IN NAND FLASH STORAGE SYSTEMS

(71) Applicant: Nanjing University, Nanjing (CN)

(72) Inventors: Qi Zhang, Nanjing (CN); Xuandong Li, Nanjing (CN); Linzhang Wang, Nanjing (CN); Tian Zhang, Nanjing (CN)

( * ) Notice: Subject to any disclaimer, the term of this patent is extended or adjusted under 35 U.S.C. 154(b) by 141 days.

(21) Appl. No.: 15/098,133

(22) Filed: Apr. 13, 2016

(65) Prior Publication Data

US 2017/0300410 A1    Oct. 19, 2017

(51) Int. Cl.
*G06F 12/12* (2016.01)
*G06F 12/02* (2006.01)

(52) U.S. Cl.
CPC ...... *G06F 12/0253* (2013.01); *G06F 12/0246* (2013.01); *G06F 2212/7203* (2013.01); *G06F 2212/7205* (2013.01)

(58) Field of Classification Search
CPC ............. G06F 12/0253; G06F 12/0246; G06F 2212/7203
USPC ........................................................ 711/103
See application file for complete search history.

(56) References Cited

U.S. PATENT DOCUMENTS 7,421,694 B2 *  9/2008  Gosalia ................ G06F 9/4843
                                                                711/204
2014/0229657 A1 *  8/2014  Karamov ............ G06F 12/0246
                                                                711/103

OTHER PUBLICATIONS

Zhang, Q. et al., "Optimizing Deterministic Garbage Collection in NAND Flash Storage Systems," Nanjing University, The Hong Kong Polytechnic University, Institute of Electrical and Electronics Engineers (IEEE), Seattle Washington, Apr. 13-15, 2015, pp. 14-23.

* cited by examiner

*Primary Examiner* — Jae U Yu
(74) *Attorney, Agent, or Firm* — Duane Morris LLP

(57) ABSTRACT

A method for partial garbage collection in a NAND flash storage system is disclosed. The method includes receiving a real time data request task in a NAND flash storage system; executing the real time data request task in the NAND flash storage system; determining a condition whether a number of free pages in the NAND flash storage system is below a pre-determined threshold; for the condition that the number of free pages in the NAND flash storage system is below a pre-determined threshold, determining whether a partial garbage collection list is empty; for the condition that the partial garbage collection list is empty, selecting a victim block from a plurality of blocks in the NAND flash storage system; creating partial garbage collection tasks in the NAND flash storage system; and putting the partial garbage collection tasks in the partial garbage collection list.

20 Claims, 13 Drawing Sheets

Worst Case Latency

Average System Latency

The Normalized Number of Valid Page Copies

The Normalized Number of Block Erase Counts

The Space Utilization Ratio

METHOD AND SYSTEM FOR OPTIMIZING DETERMINISTIC GARBAGE COLLECTION IN NAND FLASH STORAGE SYSTEMS

BACKGROUND

NAND flash storage systems have been widely adopted as storage devices in real-time embedded systems due to their small size, low power consumption, high density and good shock resistance. A typical NAND flash storage system usually includes two layers, the flash translation layer (FTL) and the memory technology device (MTD) layer. In NAND flash storage systems, page is the basic unit for read and write operations and block is the basic unit for erase operations. A block may contain a plurality of pages. The MTD layer provides primitive functions such as read, write, and erase that directly operate on the flash memory system. The FTL emulates the flash memory system as a block device so that the file system can access the flash memory transparently.

The FTL usually includes three components: an address translator, a garbage collector, and a wear-leveler. In an FTL, the address translator translates addresses between logical addresses and physical addresses based on a mapping table; the garbage collector reclaims space by erasing obsolete blocks with invalid data; the wear-leveler is an optional component that distributes write and erase operations evenly across all blocks so as to improve the lifetime of a flash memory system.

One of the major functions of an FTL is to perform garbage collection which is needed to reclaim space in NAND flash storage systems. During a garbage collection operation, a victim block's valid pages are copied (read out and written to) to a free block, and then the victim block is erased for reuse. Compared to read/write operations NAND flash storage system, a garbage collection operation takes much longer time to copy valid pages from a victim block to a free block and then erase the victim block. Garbage collection may have an adverse impact on the worst-case scenario system performance of real-time NAND flash storage systems. As a result, garbage collection optimization in NAND flash storage system is important because the worst system latency in a NAND flash storage system is determined by the performance of the garbage collection. Accordingly, garbage collection should only be triggered when the NAND flash storage system is out of free space. In addition, garbage collection optimization should not introduce excessive overhead to the average system performance of the NAND flash storage system.

In conventional garbage collection schemes, a large number of unnecessary erase operations are introduced because garbage collection is triggered at an early stage. As a result, the average system performance is deteriorated. Conventional garbage collection schemes in NAND flash cause deadline-misses in real-time embedded systems. In addition, the space overhead of conventional distributed partial garbage collection is excessive. The conventional distributed partial garbage collection does not completely solve the average performance degradation issue arising from the early stage garbage collections.

In order to solve the problems associated with conventional garbage collection schemes, a real-time garbage collection scheme is proposed to reduce the worst case scenario execution time of garbage collection. Over-provisioning is applied to map a small logical space (the capacity that users are able to see and use) to a big physical space (the capacity that a NAND flash storage system really has). Because multiple physical pages are mapped to one logical page, a certain amount of invalid pages will exist in the block. Due to over-provisioning, the number of valid page copies can be guaranteed to be less than a predetermined value based on an over-provisioning ratio. As a result, the worst-case execution time of garbage collection can be reduced. The execution time of garbage collection is relatively long because both valid-page copying and block erasing operations are performed in one garbage collection operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
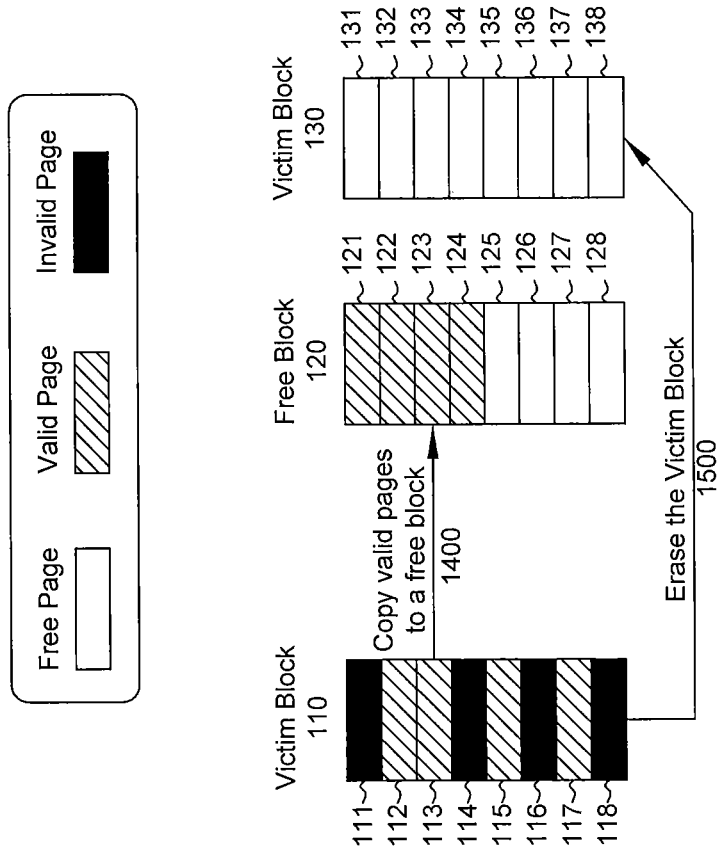
FIG. 1A is a block diagram illustrating an example of a garbage collection operation in accordance with some embodiments of the present disclosure.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Various embodiments in this application are also described in detail in Zhang et al, Optimizing Deterministic Garbage Collection in NAND Flash Storage Systems, published in the Proceedings of the 21th IEEE Real-Time and Embedded Technology and Applications Symposium (RTAS2015), IEEE Computer Society Press, 2015, pp.14-23, Apr. 13-16, 2015, which is hereby incorporated by reference in its entirety.

Partial garbage collection is proposed to divide a garbage collection operation into a plurality of smaller steps. The time of each step is no longer than that of an erasing operation. By interleaving each partial garbage collection step with the service of a read/write request, the worst system latency becomes deterministic. This is due to the fact that the longest operation time in NAND flash storage system is block erasing and that during block erasing the NAND flash storage system cannot respond to any other I/O requests. By implementing the partial garbage collection scheme, once a block is full the block will be put into a garbage collection queue. Partial garbage collection may be performed when the collection queue is not empty.

In order to improve average system performance, a distributed partial garbage collection scheme is proposed. The garbage collection queue is distributed to each logical block, and garbage collection is managed by each logical block in a distributed manner. The distributed partial garbage collection can effectively postpone garbage collection so as to improve the average system performance. According to some embodiments, garbage collection can be postponed to the latest stage with only a few free blocks left. As valid pages may become invalid later in the NAND flash storage system, postponing garbage collection can avoid unnecessary valid-page copying and erasing operations, thereby optimizing the average system latency. By combining partial garbage collection and overprovisioning, embodiments of the present disclosure can achieve optimal deterministic worst case scenario system latency. Embodiments of the present disclosure guarantee that one free block is large enough to hold all pages from both write requests and valid-page copies when a victim block is reclaimed through the partial garbage collection.

FIG. 1A is a block diagram illustrating an example of garbage collection operation in accordance with some embodiments. The victim block 110 includes 8 pages 111-118, among which, pages 111, 114, 116 and 118 are invalid pages, and pages 112, 113, 115 and 117 are valid pages. The free block 120 includes 8 pages 121-128, among which, pages 121-124 are valid pages and pages 125-128 are free pages. The victim block 130 includes 8 pages 131-138, and they are all victim pages. According to some embodiments, during the garbage collection operation, valid pages 112, 113, 115 and 117 in the victim block 110 are copied to a free block 120. The operation of copying valid pages to a free block is designated as operation 1400. According to some embodiments, a page copying includes a page read and a page write. After page copying, the victim block 110 is erased to become erased victim block 130. The operation of erasing the victim block is designated as operation 1500. According to some embodiments, other negligible time overhead is ignored. According to some embodiments, only the major time from read (25 μs per page), write (200 μs per page) and erase (1500 μs per block) operations are considered. According to some embodiments with the parameters in Table A, it takes approximately 4×(25+200)+1500=2400 μs to finish this garbage collection operation

TABLE A

| Parameter | Value |
| --- | --- |
| Total capacity | 8 Gb |
| The number of planes per element | 4 |
| The number of blocks per plane | 2048 |
| The number of pages per block | 64 |
| Page size | 2 KB |
| Block size | 128 KB |
| Endurance | 100K P/E Cycles |
| Page read latency | 25 μs |
| Page write latency | 200 μs |
| Block erase latency | 1500 μs |

Figure 1B:
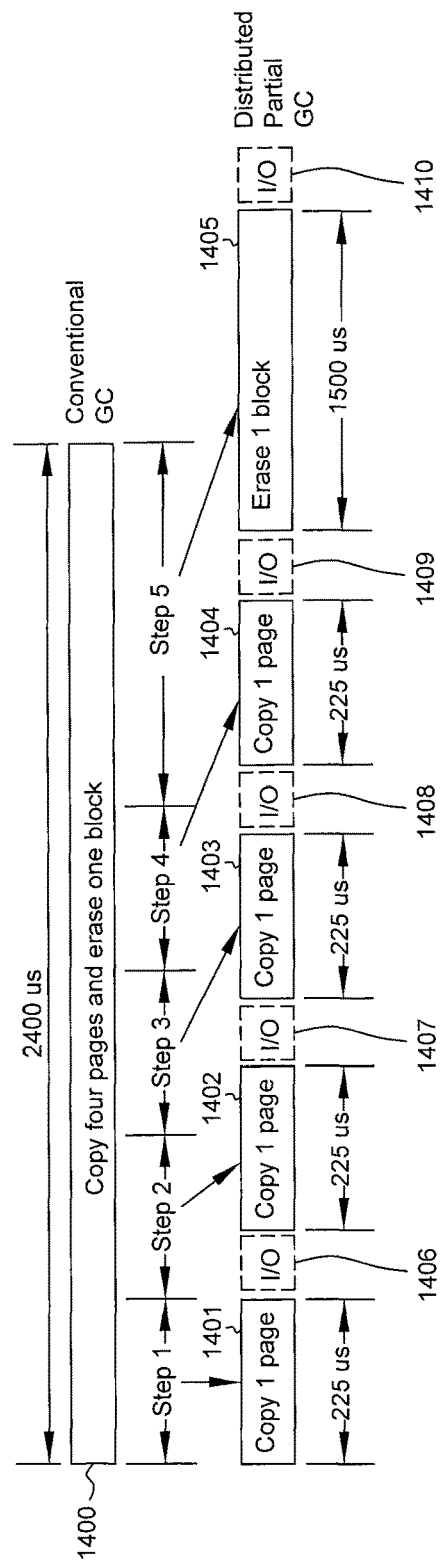
FIG. 1B is a diagram illustrating a comparison between a conventional garbage collection operation and a partial garbage collection operation in accordance with some embodiments of the present disclosure.

FIG. 1B is a diagram illustrating a comparison between the conventional garbage collection and a partial garbage collection operation in accordance with some embodiments. According to some embodiments, in order to shorten the latency introduced by garbage collection, a partial garbage collection mechanism is implemented. For the same garbage collection operation in FIG. 1A, the conventional garbage collection operation 1400 is divided into several smaller steps 1401, 1402, 1403 and 1404, and each step interleaves with the service of a read or write request. The time of each step is no longer than an erase operation 1405 which is the longest operation time. During the erase operation 1405, the system cannot respond to I/O requests. According to some embodiments, the steps 1401 and 1402 are interleaved by I/O operation 1406, the steps 1402 and 1403 are interleaved by I/O operation 1407, the steps 1403 and 1404 are interleaved by I/O operation 1408, the steps 1404 and 1405 are interleaved by I/O operation 1409, the erase step 1405 is followed by I/O operation 1410. According to some embodiments, operations 1401-1404 are of 255 μs each, and the operation 1405 is of 1500 μs.

Figure 1C:
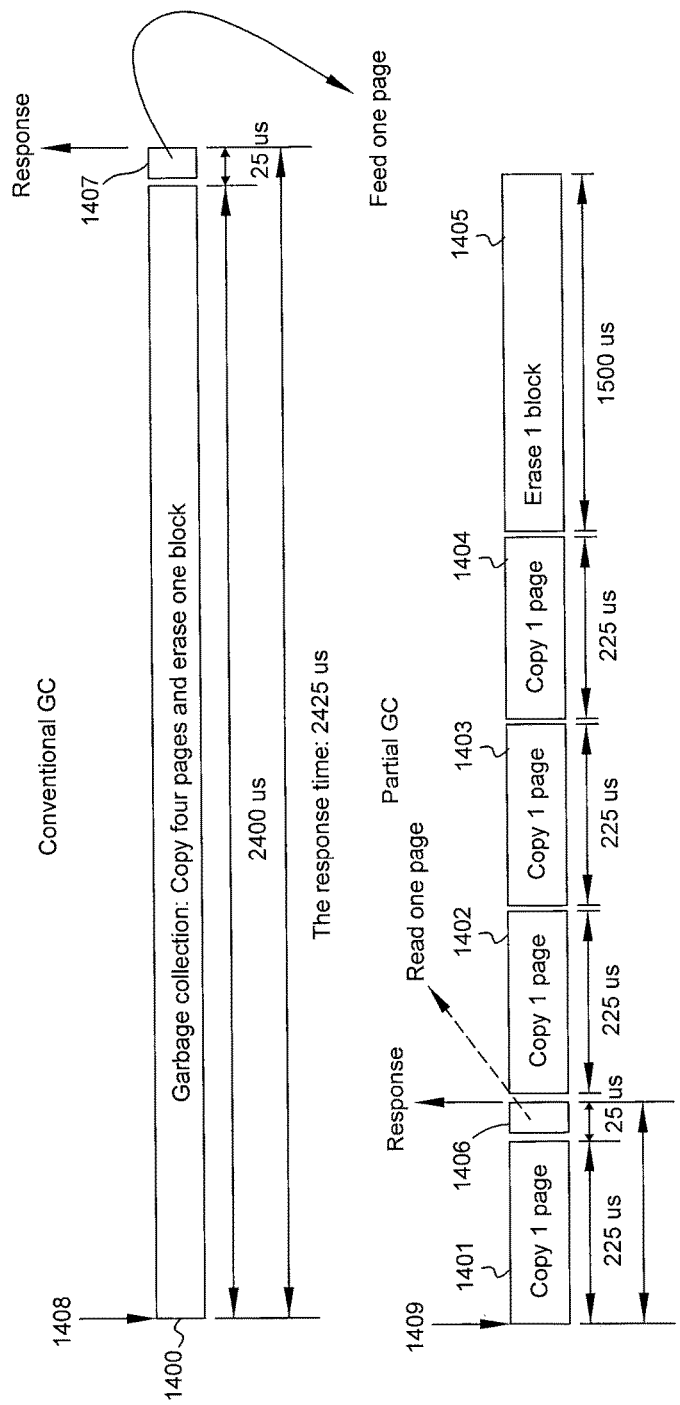
FIG. 1C is a diagram illustrating a comparison of the latency of a request between a conventional garbage collection operation and a partial garbage collection operation in accordance with some embodiments of the present disclosure.

FIG. 1C is a diagram illustrating a comparison of the latency of a request between the conventional garbage collection and the partial garbage collection operation in accordance with some embodiments. According to some embodiments, in a NAND flash storage system, I/O requests are served by an FTL that fetch data from the NAND flash storage system and return them to the file system. In the WCET (Worst-Case Execution Time) analysis of a real-time task, considerations need to be given to the storage system latency of a request when the task sends requests to NAND flash storage systems. Given a read or write request, it is defined that the storage system latency of the request is the time period from the point when the request is issued from the file system to the point when the request has been served and the result has been returned from the FTL. According to some embodiments, in order to simplify the definition of a data request, each data request in FTL is defined to have only one page read/write operation. The storage system latency of a request is determined by the read/write page operation and the garbage collection, whose execution time are several orders of magnitude larger than these of other operations of the FTL.

According to some embodiments, the latency of a request varies. For example, using the parameters in Table A, if a read request arrives when the system is idle, its system latency is 25 μs. According to some embodiments, if the read request 1407 arrives just after the conventional garbage collection 1400 starts as shown in FIG. 1C, the latency is 2400+25=2425 μs. According to some embodiments, if instead the partial garbage collection is implemented, the read request 1406 arrives after the first partial garbage collection operation 1401, the latency is 225+25=250 μs. According to some embodiments, for a NAND flash storage system, the worst system latency is defined as the longest latency time for all read and write requests, and the average system latency is defined as the average latency for all read and write requests.

According to some embodiments, as shown in FIG. 1C, garbage collection plays a very important role in influencing the latency of a request. According to some embodiments, $t_{er}$ is the block erase time, $t_{wr}$ is the page write time, and $t_{rd}$ is the page read time. The worst system latency can be minimized by the partial garbage collection, and its optimal value can be represented as the following:

$$\text{Optimal}_{13} \text{ WCET} = t_{er} + \max\{t_{wr}, t_{rd}\} = t_{er} + t_{wr} \quad (1)$$

The average system latency is influenced by the garbage collection operations that happened during read and write requests, and can be calculated as the following:

$$\frac{N_{rd} \times t_{rd} + N_{wr} \times t_{wr} + \Sigma_{i=1 \to N_{GC}} t_{CG_i}}{N_{rd} + N_{wr}} \quad (2)$$

In the above equation, $N_{rd}$ and $N_{wr}$ are the numbers of read and write requests, respectively, $N_{GC}$ is the number of the garbage collection operations involved, and $t_{GCi}$ is the execution time of the $i^{th}$ garbage collection. The optimal average system latency is achieved when there is not any garbage collection operation during all read and write requests, and it can be represented as the following:

$$\text{Optimal\_Average} = \frac{N_{rd} \times t_{rd} + N_{wr} \times t_{wr}}{N_{rd} + N_{wr}} \quad (3)$$

Figure 2:
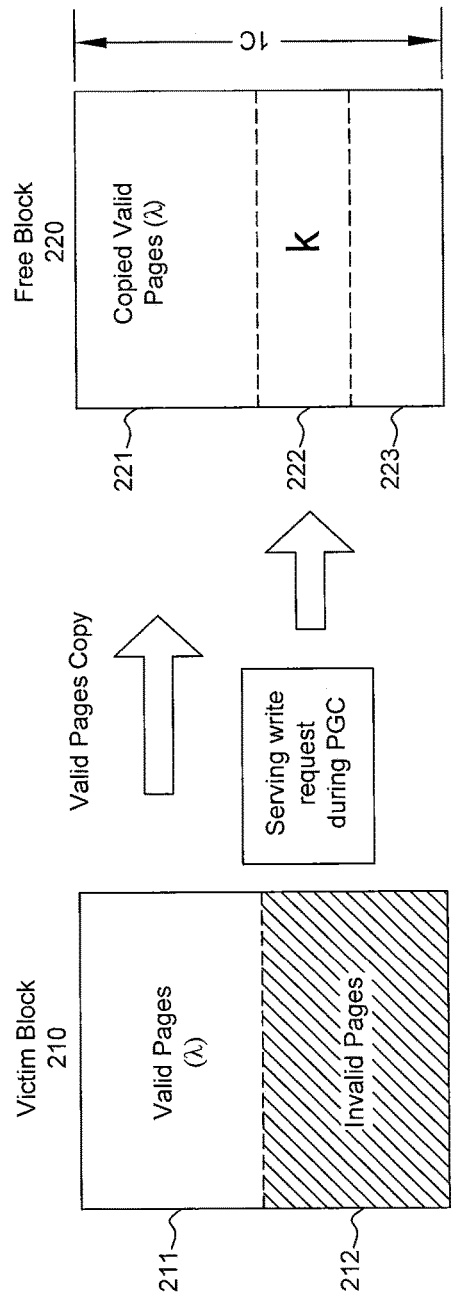
FIG. 2 is a block diagram illustrating a partial garbage collection scheme in accordance with some embodiments of the present disclosure.

FIG. 2 is a block diagram illustrating the partial garbage collection scheme in accordance with some embodiments. To archive the worst deterministic system latency, the partial garbage collection scheme is implemented. Each read or write request can only be influenced by at most one partial garbage collection step, so $t_{GCi}$ is no larger than $t_{er}$ in Equation 2 above. In order to optimize the average system latency, as shown in Equation 2 above, the number of the garbage collection operations during the process of serving read and write requests needs to be reduced. Furthermore, the execution time of the garbage collection involving read or write requests needs to be reduced. According to some embodiments, garbage collection can be postponed to the latest stage when the system space is running out. As valid pages may become invalid later in NAND flash storage system, postponing garbage collection can avoid unnecessary valid page copying and erasing operations. As a result, garbage collection overhead is reduced. According to some embodiments, with the above two strategies, the average system latency can be improved. According to some embodiments, a deterministic worst system latency can be provided.

According to some embodiments, the victim block 210 includes λ valid pages 211 and a plurality of invalid pages 212. The free block 220 includes the λ copied valid pages 221, k partial garbage collections pages 222, and the remaining pages 223. According to some embodiments, when a victim block 210 is selected, the partial garbage collection scheme guarantees that it contains at most λ valid pages. Then, the victim block 210 is reclaimed through the partial garbage collection. According to some embodiments, coping λ valid pages 221 and erasing a victim block require k partial garbage collection steps and each step is executed after each write data request. The entire garbage collection process is completed after k write requests. As a result, these k pages 222 need to be stored. Let π be the page number in a block. As long as $$k + \lambda \le \pi$$

is satisfied, one free block can be used to hold both λ, valid pages 221 from the victim block 210, and k pages 222 from write requests during reclaiming the victim block 210. After k partial garbage collection steps, the victim block 210 becomes free, accordingly one free block can always be provided for garbage collection.

Figure 3:
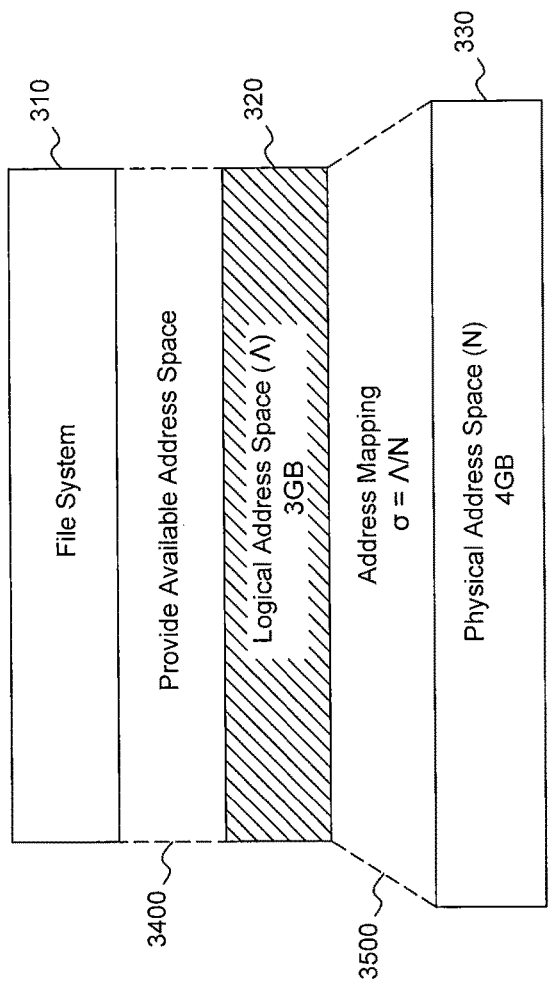
FIG. 3 is a block diagram illustrating an over-provisioning strategy in accordance with some embodiments of the present disclosure.

FIG. 3 is a block diagram illustrating over-provisioning strategy in accordance with some embodiments. According to some embodiments, the partial garbage collection and the over-provisioning are combined. Partial garbage collection can be invoked during the system idle time to avoid the situation when free space depletes too fast. The system idle time, however, depends on the workload and requires operating system information. According to some embodiments, the extreme worst case is considered and the garbage collection is postponed as late as possible. As discussed above, to achieve the joint worst-case and average-case optimization, the key is to satisfy k+λ≤π. With the partial garbage collection, the maximum valid pages allowed in a victim block (the maximum value of λ) is first obtained. Assuming k is the number of partial steps needed to reclaim a victim block with λ valid pages:

$$\alpha = \left\lfloor \frac{t_{er}}{t_{rd} + t_{wr}} \right\rfloor \quad (4)$$

$$k = \left\lceil \frac{\lambda}{\alpha} \right\rceil + 1 \quad (5)$$

Equation 4 shows how many page copies (represented by α) can be finished during one partial step. According to some embodiments, with the partial garbage collection, the longest atom time of a partial step is the time to erase a block. Accordingly, α can be obtained by dividing $t_{er}$ (the time to erase one block) with the summation of $t_{rd}$ and $t_{wr}$ (the time to read and write one page for one page copy). Equation 5 represents how many partial steps are needed to reclaim one block with λ valid pages (λ/α valid-page copies and one erase operation).

As a result, based on k+λ≤π:

$$\left\lceil \frac{\lambda}{\alpha} \right\rceil + 1 + \lambda \leq \pi \quad (6)$$

According to some embodiments, in a NAND flash storage system, α is fixed. As a result, based on Equation 6, the maximum value of λ (i.e., the maximum valid pages allowed in a victim block) can be obtained. By implementing over-provisioning strategy, the present scheme guarantees the number of valid pages if victim block is less than the maximum allowed value of λ (i.e., the upper bound of λ, represented by U(λ)).

In the over-provisioning strategy, a large physical space 330 in a NAND flash storage system is mapped to a small logical space 320 in the file system. As shown in FIG. 3, there is a 3 GB logical address space 320 mapping to the entire 4 GB physical address space 330. When the flash space is almost full, there are at least a number of invalid pages in the flash (1 GB in the FIG. 3). According to some embodiments, σ represents the ratio between the logical and physical space, σ=Λ/N, where Λ represents the number of logical pages from the file system, while N denotes the total number of data pages in the physical space. When the flash is almost full (i.e., only one free block left), by adopting greedy strategy to select the victim block containing the least valid pages, the upper bound of the λ can be calculated using the following equation:

$$U(\lambda) = \lceil \sigma \times \pi \rceil \quad (7)$$

According to some embodiments, a proof is provided. Suppose there are M data blocks and each block has π pages, according to the definition, the total number of physical data pages is N=π×M and the total number of valid pages is σ×π×M. By selecting the victim block which has the least number of valid pages (denoted as $\lambda_{min}$), there should be at least $\lambda_{min}$ valid pages in each of the rest data blocks. Suppose the $\lambda_{min}$ is more than U(λ) (i.e., U(λ)+1), the total number of valid page is ⌈σ×π⌉×M+M. The value is more than the pre-defined value of σ×π×M, which causes a contradiction. As a result, the $\lambda_{min}$ is no more than the U(λ).

The value of U(λ) is independent of the workload and U(λ) is only related to the space configuration (σ) and the flash specification (π). Therefore, the present scheme guarantees the maximum value of λ from over-provisioning strategy. By combining Equations 5 and 6, the relationship between partial garbage collection and space configuration in Equation 8 can be obtained. The upper bound of σ only depends on the constants α and π. Therefore, the present scheme satisfies k+λ≤π only when the ratio of logical address space and physical address space is configured lower than the upper bound of U(σ).

$$\mathcal{U}(\sigma) = \frac{(\pi-1)\alpha}{(\alpha+1)\pi} \quad (8)$$

Figure 4:
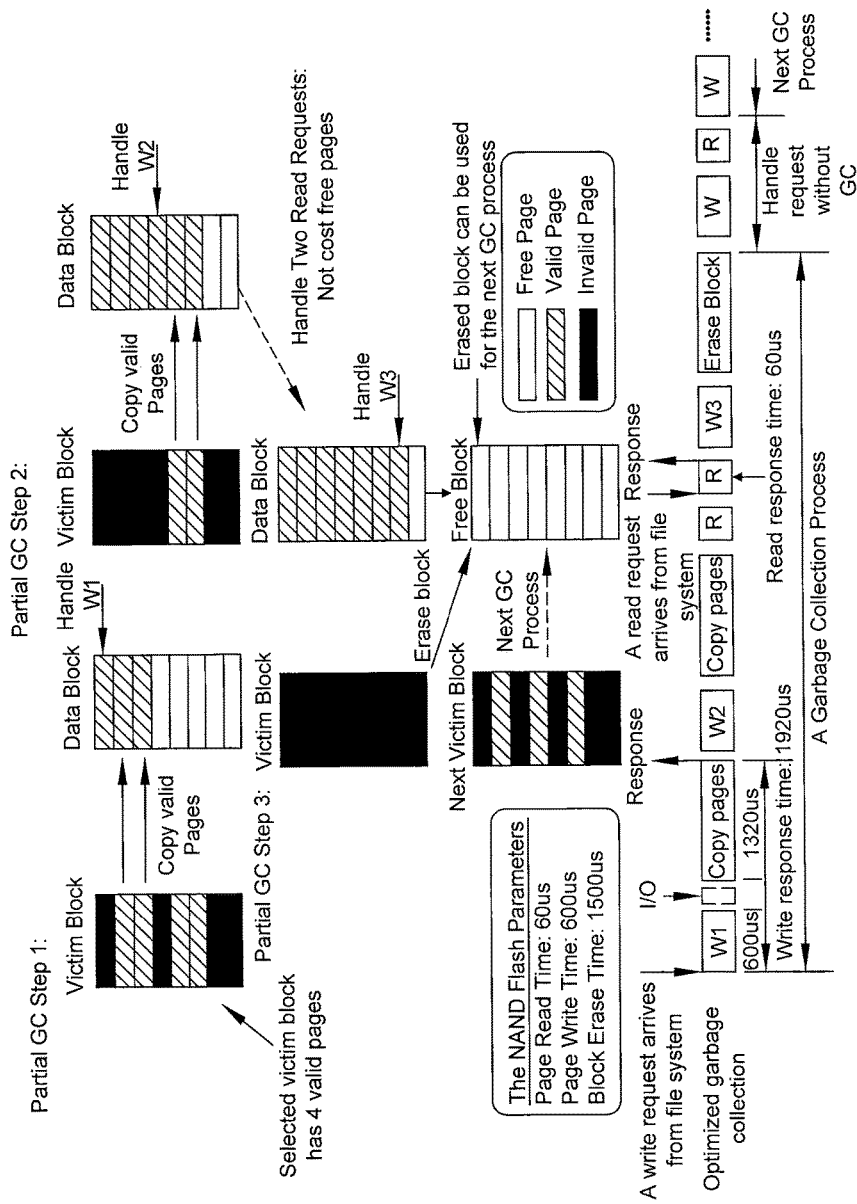
FIG. 4 is a block diagram illustrating a partial garbage collection process in accordance with some embodiments of the present disclosure.

FIG. 4 is a block diagram illustrating partial garbage collection process in accordance with some embodiments. Suppose there are 4 data blocks, each of which has 8 data pages (π=8), and execution time of read ($t_{rd}$), write ($t_{wr}$), and erase operation ($t_{er}$) are 60 μs, 600 μs, and 1500 μs, respectively. Therefore, α=⌊1500/(60+600)⌋=2 and the upper bound of σ is ((π−1)α)/((α+1)π)=(7×2)/(3×8)≈0.583, which means the logical address space is at most 58.3% of the physical address space. According to some embodiments, for example, σ=0.5. When the flash is full, the total number of valid pages does not exceed (4×8)×0.5=16. If selecting a victim block with greedy strategy, there is at most 4 valid pages in the block. Therefore, at most k=λ/α+1=4/2+1=3 partial garbage collection steps can be generated. As shown in the example, when there is one free block left in the flash and the after handling the write request W1 to the first page, the present scheme executes partial step 1 to copy first two valid pages. At the partial GC step 2 as the step 1, there are two upcoming read requests. Since the read requests will not cost free data pages, the present scheme will not schedule partial steps to read requests. Finally, the last partial step 3 erases the victim block to reclaim a new free block. The entire garbage collection process costs k+λ=3+4=7 pages but can reclaim a free block which has 8 data pages. The next data request will not trigger any partial steps until there is only one free block left again and at that time. The last reclaimed block can be used for the next garbage collection process. Therefore, the condition k+λ≤π is satisfied by using only one free data block. The partial garbage collection has the lowest impact to data requests, resulting in the lowest level of the worst case system latency of write request. The partial garbage collection can achieve jointly optimized the worst-case and average-case latency.

Address translation scheme impacts data storage and garbage collection strategies. There are many address mapping schemes in FTLs, which can be categorized to block-level mapping, page-level mapping and hybrid-level mapping scheme. In order to achieve the optimizing deterministic worst-case performance, the present scheme adopts partial garbage collection technique and uses one block to handle the valid page copying and the upcoming data requests. Since the logical addresses from victim blocks and data requests are unpredictable, the address translator needs to translate the logical address to physical address without limits, and allocate data to any free pages. In order to achieve the optimizing average-case latency, the garbage collection should be postponed as late as possible. That requires the garbage collection trigger point to be independent of the logical address of the upcoming data request. On the other hand, overprovisioning guarantees the reclaimed free pages based on global victim block selection in the full usage of flash memory. Therefore, data in the present scheme can be stored in any data block and the page-level mapping information should be recorded.

The block-level mapping and hybrid-mapping schemes are not applicable to the present garbage collection scheme because they cannot record the fine-granularity address mapping information. In contrast, in page-level mapping scheme, data blocks can store data from any logical address because every local page to physical page mapping is recorded. As a result, the physical space of flash is fully utilized and the garbage collection can be triggered when there is only one free block. Therefore, address translator is implemented by adopting page-level address mapping scheme, which can provide intrinsic high performance and help the present garbage collection scheme to achieve worst-case and average-case optimization. The drawback of page-level mapping scheme is the RAM space cost. There has been several on-demand approaches, and the present scheme can adopt these approaches to significantly reduce the RAM cost.

Wear-leveler influences the endurance of the flash memory and relates to garbage collection strategy. Since the present scheme optimizes the average-case performance by postponing garbage collection as late as possible, the erase counts of each block is improved. In order to balance the erase counts of each data block, the present scheme also checks the block erase counts when selecting the victim block. When multiple blocks have the same least number of valid pages, the present wear leveler will select the block that has lower number of erase counts as the victim block. For many cold blocks that are not updated frequently, block swaps are implemented between the hot block and cold block when the number of remaining free blocks does not meet the garbage collection threshold. Therefore, the present scheme does not incur much garbage collection overhead and can improve the lifetime by balancing the block erase counts.

According to some embodiments, the system latency in the worst case includes data request execution time and the upper bound of garbage collection execution time. As shown in Table B below, U(er) and U(ew) represent the page read operation time and write operation time, respectively.

the garbage collection trigger condition. The present scheme triggers garbage collection only when there is one free block left in the flash. GFTL and RFTL trigger garbage collection when the physical block allocated to the logical block number (LBN) from the request is full. RTGC triggers garbage collection according to the space usage from the real-time tasks. As a result, RTGC gives a fixed threshold and buffer length without tasks information. According to some embodiments, the garbage collection in GFTL or RFTL is invoked very early, and the space utilization is very low under the unbalanced workload. As a result, the average system performance is degraded by such an early invoked garbage collection. And the high number of block erases indirectly impacts on the endurance of the flash memory.

Figure 5:
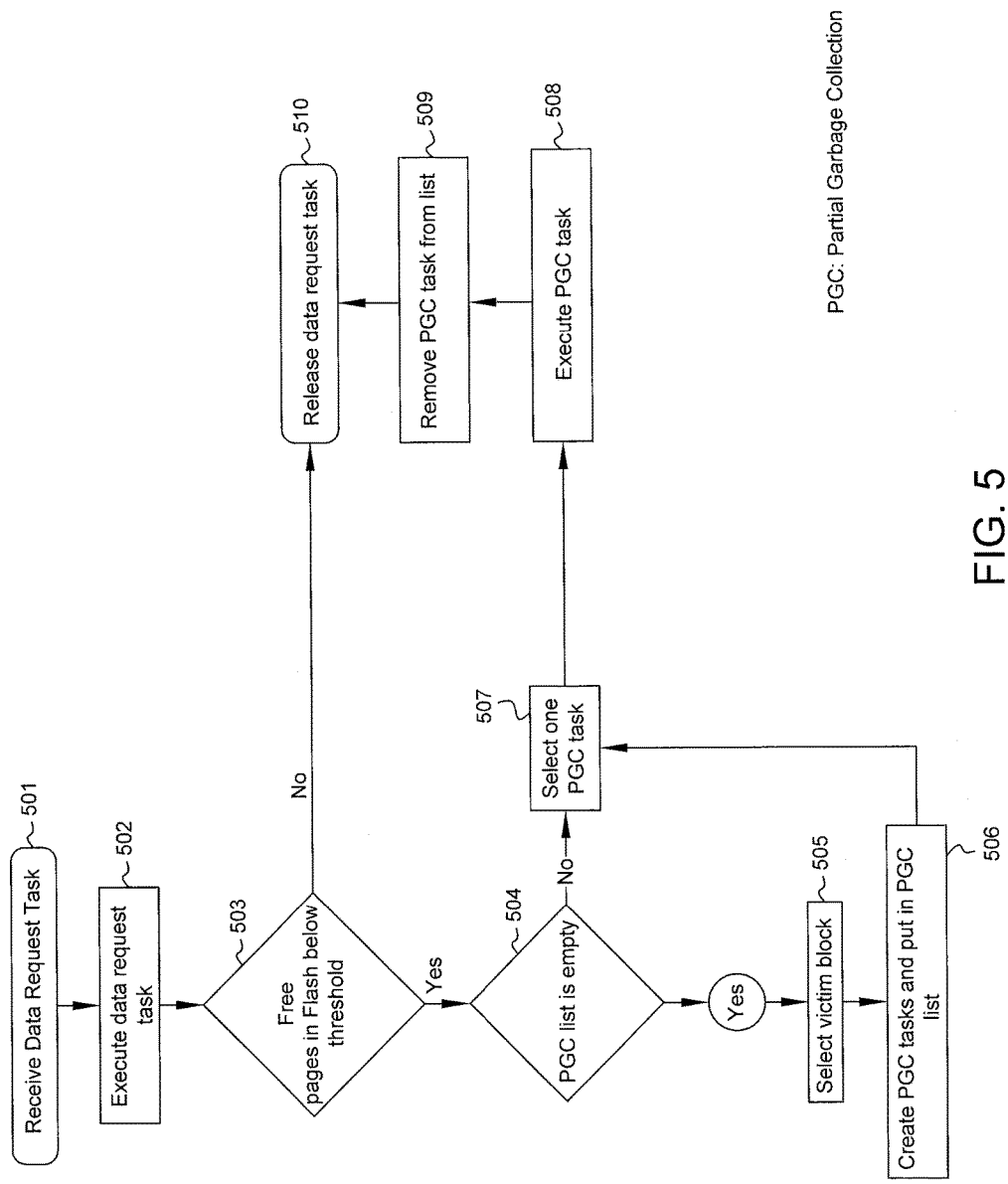
FIG. 5 is a flowchart illustrating a partial garbage collection process in accordance with some embodiments of the present disclosure.

FIG. 5 is a flowchart illustrating partial garbage collection process in accordance with some embodiments. At step 501, the NAND flash system receives data request task. At step 502, the NAND flash system executes data request task. At step 503, the NAND flash system determines whether free pages in flash are below threshold. For the condition that free pages in flash are not below threshold, go to step 510, release data request task. For the condition that free pages in

TABLE B

| Bounds | Ideal | RTGC | GFTL | RFTL | WAO-GC |
|---|---|---|---|---|---|
| $U(e_r)$ | $t_{rdpg}$ | $t_{rdpg}$ | $t_{rdpg} + \pi t_{rdoob}$ | $t_{rdpg} + t_{rdoob}$ | $t_{rdpg}$ |
| $U(e_w)$ | $t_{wrpg}$ | $t_{wrpg}$ | $t_{wrpg}$ | $t_{wrpg} + t_{rdoob}$ | $t_{wrpg}$ |
| $U(\lambda)$ | $\pi$ | $\sigma \times \pi$ | $\pi$ | $\pi$ | $\sigma \times \pi$ |
| $U(t)$ | $U(e_w) + U(e_G)$ | $U(e_w) + U(e_G)$ | $t_{er} + \max\{U(e_r), U(e_w)\}$ | $\max\{U(e_r), t_{er} + U(e_w)\}$ | $\max\{U(e_r), t_{er} + U(e_w)\}$ |
| Threshold | 1 | N/A | isFull(LBN) | isFull(LBN) | 1 |
| $L_{buf}$ | N/A | N/A | $N(k+1)/2$ | $2 \times \pi \times N$ | k |

GFTL uses block-level mapping scheme, where the logical page number is written into the OOB area. There are many OOB read operations when handling one data request. RFTL uses hybrid-level mapping scheme and the mapping table is partially stored in the OOB area so that it also exists during some OOB operations. U(t) denotes the upper bound of the system latency in the worst case and the value of Ideal and RTGC scheme depends on the upper bound of the entire garbage collection process execution time. GFTL schedules partial garbage collection step to any data request that impacts the read performance. Since the present scheme adopts page-level mapping scheme whose mapping table is maintained in the RAM, there is no extra OOB operations compared with GFTL and RFTL. Therefore, WAO-GC improves the upper bound of the worst system latency.

According to some embodiments, garbage collection introduces the largest overhead in NAND flash memory storage systems due to valid page copying and block erasing. WAO-GC adopts page-level mapping scheme that can fully use each page in the flash. WAO-GC delays the partial garbage collection until when the system space is running out. Compared to the present scheme, GFTL predefines a number of physical blocks as the write buffer and maintains a central garbage collection queue to decide which logical block executes garbage collection. RFTL pre-allocates three physical blocks (i.e., primary block, replacement block, and buffer block) to one logical block so that the execution of partial garbage collection is limited to the corresponding logical block. According to some embodiments, once the primary physical block of the corresponding logical block is full, even there exists free space in many physical blocks belonging to other logical blocks, GFTL and RFTL all trigger garbage collection. Threshold in Table B represents flash are below threshold, go to step 504, determine whether the partial garbage collection list is empty. For the condition that the partial garbage collection list is empty, go to step 505, select victim block. For the condition that the partial garbage collection list is not empty, go to step 507, select one partial garbage collection task. After step 505, at step 506, create partial garbage collection tasks and put them in the partial garbage collection list. Then go to step 507, select one partial garbage collection task. After step 507, at step 508, execute partial garbage collection task. At step 509, remove partial garbage collection task from the list. And finally, at step 510, release data request task.

Figure 6:
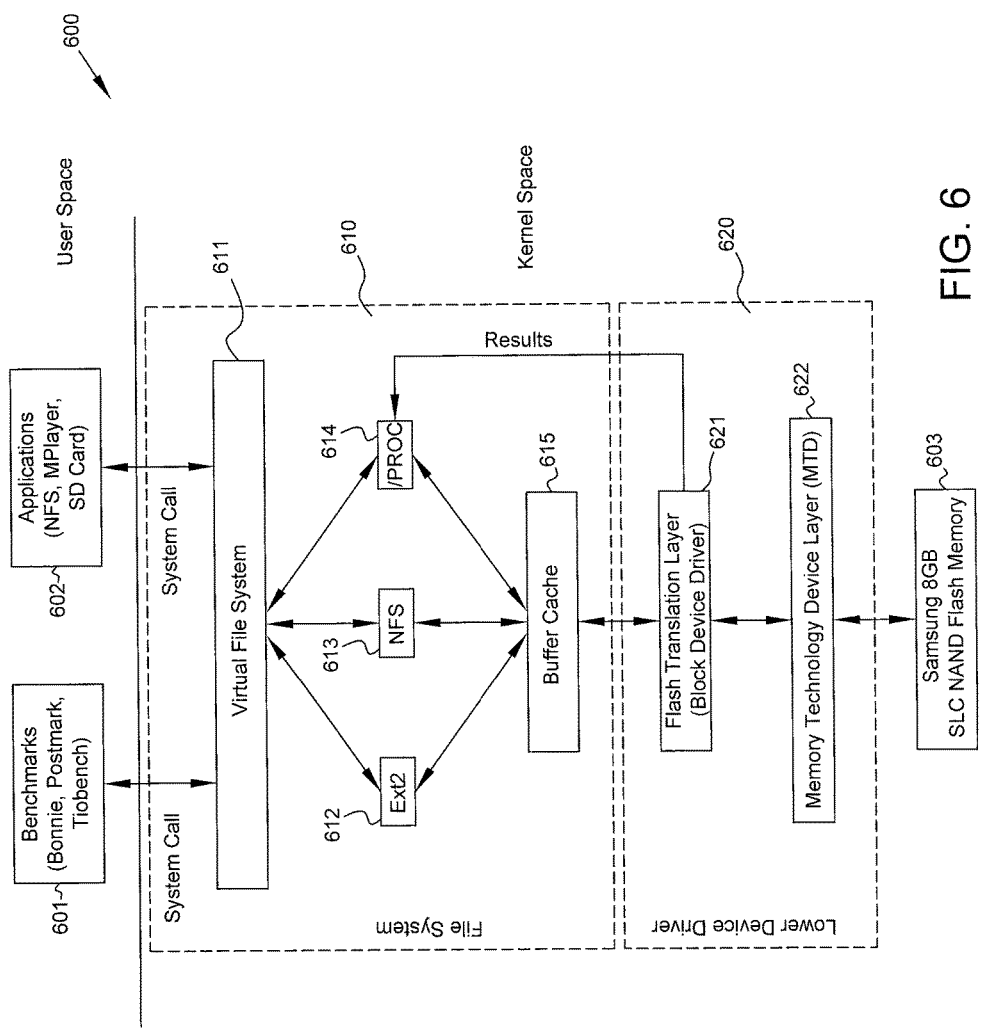
FIG. 6 is a functional block diagram illustrating a system for partial garbage collection in accordance with some embodiments of the present disclosure.

FIG. 6 is a block diagram illustrating a system for partial garbage collection in accordance with some embodiments. The system 600 includes a kernel space module 610 and a lower device driver module 620. In the user space according to some embodiments, the benchmark module 601 includes standard benchmarks which are commonly used (i.e., Bonnie, Postmark and Tiobench, etc.) According to some embodiments, the applications module 602 includes such applications as NFS, MPlayer and SD card. According to some embodiments, a NFS (Net File System) is implemented and perform file operations which can reflect the real workload of the system in accessing the NAND flash memory chip.

According to some embodiments, the Bonnie benchmark in the benchmark module 601 can perform a number of file seeks and meta-data operations to test the file system performance. The Tiobench benchmark uses many threads concurrently accessing a specified file directory. The Postmark benchmark creates a large amount of files under a specified file directory. The VFS (Virtual File System) module 611 is used to hide different file system (such as Ext2

612, NFS 613 and/PROC 614) features and provide generic interfaces for user space programs. When the applications in applications module 602 or benchmarks in benchmark module 601 work under a specified file directory, the file operations are passed to the file system through the system calls. After the NAND flash system receives these requests, it interprets these requests and issues requests to the lower device driver, such as FTL in the flash translation layer 621, mainly in terms of a sector (or page) reading and writing. The buffer cache 615 is adopted by the file system to improve the file system performance. If the buffer cache 615 could not handle requests or the system is ideal, the victim or cached data will be transferred to the lower FTL module 621. The FTL module 621 maps these requests to the physical NAND flash memory 603 with the help of MTD (Memory Technology Device) module 622. According to some embodiments, the results are generated in the FTL layer 621. For the reason that the user could not access kernel space data directly, the/PROC file system is implemented to build communication between user space and kernel space by the means of creating a specified file under the/proc file directory. According to some embodiments, test results are obtained through/PROC file system.

According to some embodiments, pure-page-level FTL, RTGC, GFTL, RFTL are implemented. According to some embodiments, the scheme as block device drivers is also implemented. The Linux kernel loads these drivers as kernel modules implemented between the file system and the MTD layer 622. After these FTLs are inserted into the kernel 610, the corresponding device files will be created under the /dev directory. Then with the help of file system formatting tools such as mkfs.ext2, the file system information is written in the NAND flash memory 603. According to some embodiments, by mounting these device files to a specified file directory, the NAND flash memory 603 can be operated through normal file operations, such as file creation, file reading, etc. According to some embodiments, the basic parameters of the NAND flash memory 603 is shown in Table A. According to some embodiments, the Linux kernel function do_gettimeofday is implemented to measure the system latency. Due to the operating system handling time, the latency time from the kernel function may not be consistent with the pure NAND flash memory operations executing time. According to some embodiments, the entire NAND flash memory is formatted before experimental evaluations.

According to some embodiments, the following metrics to evaluate the performance of the present approach: 1) system latency in the worst case scenario, which is the longest system latency when handling data requests from the benchmarks and applications; 2) average system latency, the total request latency is divided by the counts to get the average system latency; 3) valid page copies, the number of valid page copies is recorded to show the overhead of the garbage collections; and 4) block erase counts, which is measured to show the frequency of the garbage collection.

Figure 7:
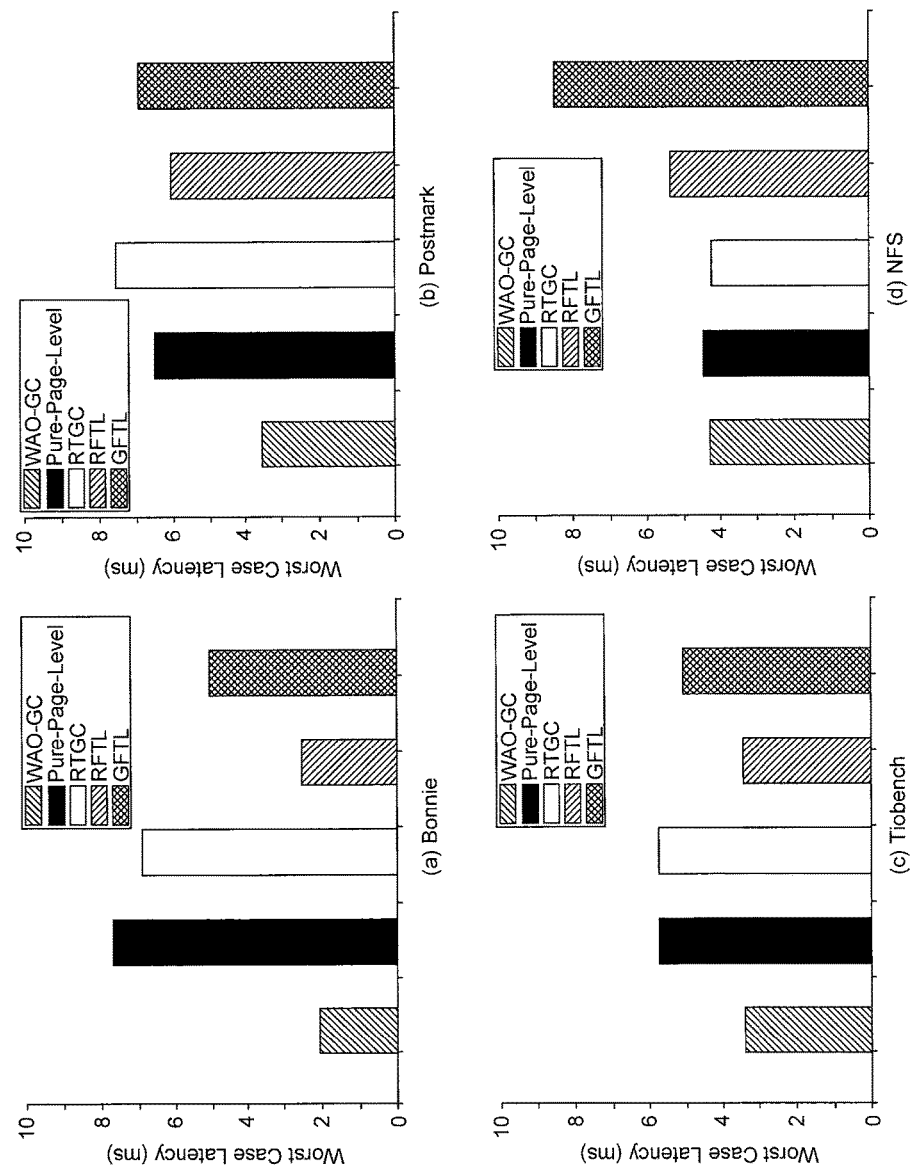
FIG. 7 are bar charts comparing the worst case system latency of WAO-GC with the worst case system latency of pure-page-level, RTGC, GFTL and RFTL in accordance with some embodiments of the present disclosure.

FIG. 7 are bar charts comparing the worst case system latency of WAO-GC with the worst case system latency of pure-page-level, RTGC, GFTL and RFTL in accordance with some embodiments of the present disclosure. By making use of partial garbage collection technology, GFTL, RFTL, and the present scheme guarantees the system latency of the data request in the worst case scenario. According to some embodiments, WAO-GC can achieve lower system latency in the worst case compared to GFTL, RFTL. According to some embodiments, both GFTL and RFTL has extra OOB operations to get the real mapping information, while WAO-GC maintains all page-level mappings into RAM. The major benefits of worst case system latency in the present scheme come from the page-level mapping scheme, which introduces large RAM cost. According to some embodiments, compared to GFTL and RFTL, WAO-GC improves system latency by 47.14% and 19.80% respectively in the worst case. According to some embodiments, pure-page-level cannot provide a deterministic garbage collection execution time. As a result, their worst system latency is worse than that of the present scheme. For the reason that the running operation system is a general Linux and is not modified to support real-time tasks, RTGC cannot reclaim free pages for each real-time task. As a result, RTGC cannot provide deterministic data request serve time. However, RTGC adopts over-provisioning strategy that reduces the number of valid pages in the victim block. According to some embodiments, the worst system latency of RTGC is lower than that of the pure-page-level FTL scheme. Compared to pure-page-level and RTGC, WAO-GC archives 40.51% and 40.24% reduction on worst case system latency respectively.

Figure 8:
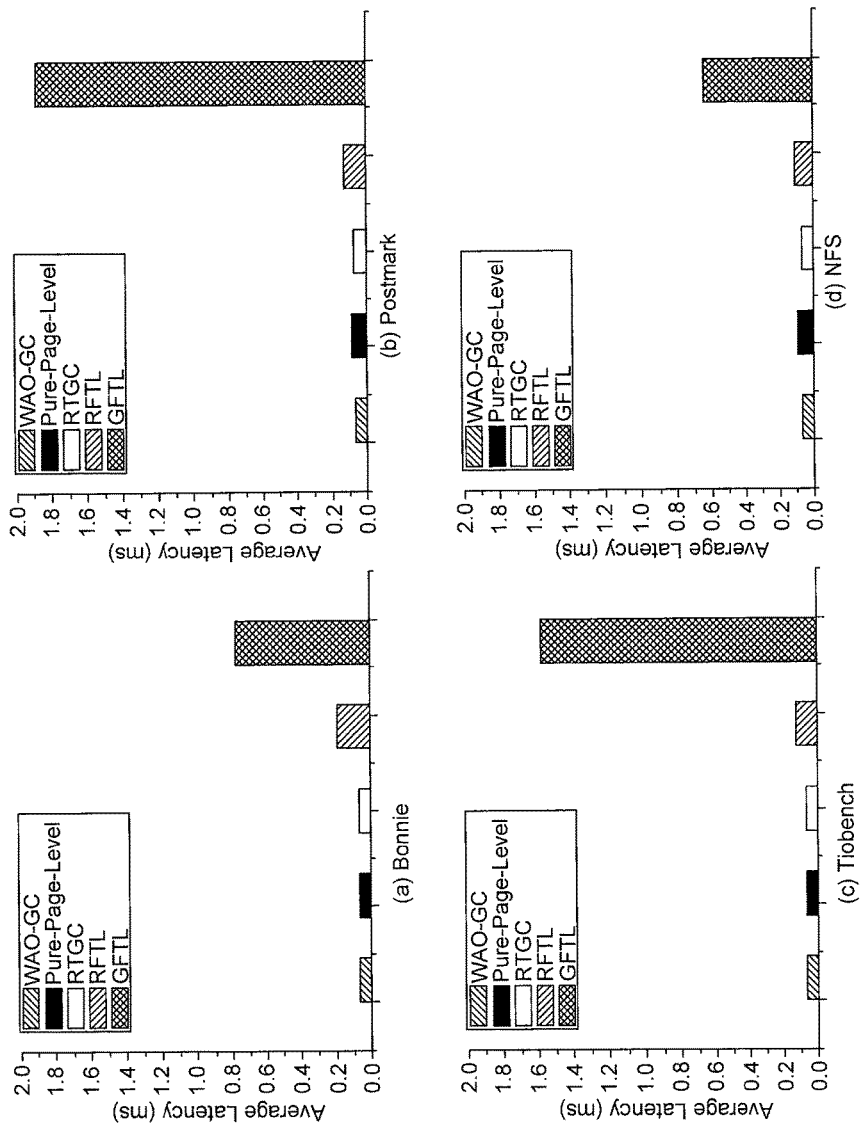
FIG. 8 are bar charts comparing the average system latency of WAO-GC with the average system latency of pure-page-level, RTGC, GFTL and RFTL in accordance with some embodiments of the present disclosure.

FIG. 8 are bar charts comparing the average system latency of WAO-GC with the average system latency of pure-page-level, RTGC, GFTL and RFTL in accordance with some embodiments of the present disclosure. Given that the worst case scenario does not happen frequently, optimizing garbage collection for giving a deterministic worst case system latency should not bring too much overhead to the average system latency. Therefore the average system latency is one of the most important metrics representing the system performance. According to some embodiments, GFTL and RFTL suffer from significant average performance degradation compared to pure-page-level scheme and the present scheme. That is because the present scheme adopts page-level address mapping scheme that can freely manage the data and postpone the partial garbage collection as late as possible. Compare to the present scheme, GFTL adopts block-level mapping scheme and once a logical block is fully used, the corresponding physical block is added to central garbage collection queue to perform partial garbage collection. As a result, there is a large number of unnecessary and early triggered garbage collections. RFTL pre-allocates three physical blocks to one logical block and when the logical block is full, the partial garbage collection is triggered within the allocated blocks. Therefore, RFTL also triggers garbage collection early and requires large amount of extra physical flash space. According to some embodiments, compared to RFTL and GFTL, the present scheme achieves an average of 47.01% and 93.48% reduction on average system latency respectively. This result is better than that of pure-page-level mapping scheme because the over-provisioning strategy reduces valid page copies in victim block.

Figure 9:
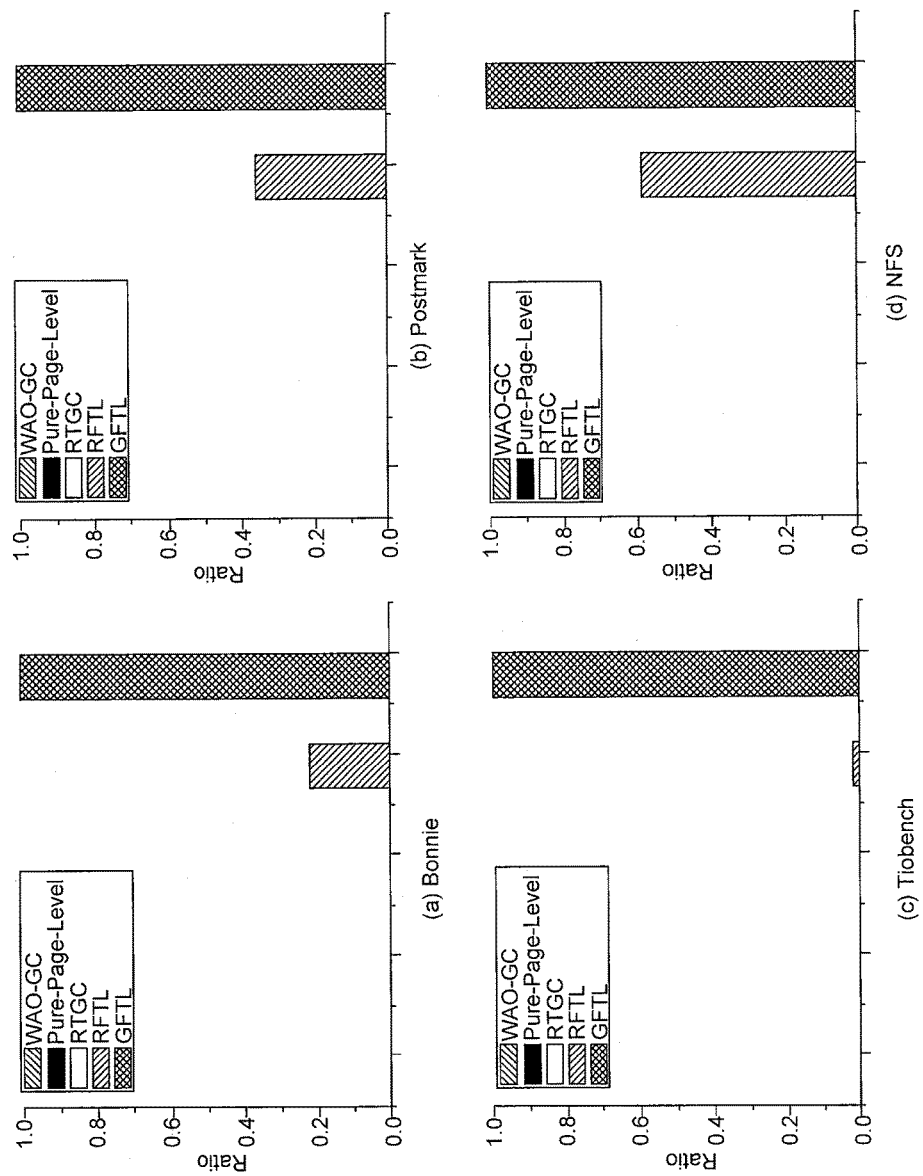
FIG. 9 are bar charts comparing the normalized number of valid page copies of WAO-GC with the normalized number of valid page copies of pure-page-level, RTGC, GFTL and RFTL in accordance with some embodiments of the present disclosure.

FIG. 9 are bar charts comparing the normalized number of valid page copies of WAO-GC with the normalized number of valid page copies of pure-page-level, RTGC, GFTL and RFTL in accordance with some embodiments of the present disclosure. The number of valid page copies in garbage collection determines the time overhead of the garbage collection process. By making use of page-level address mapping scheme, WAO-GC fully uses the free pages in the flash and postpones the garbage collection. In addition, the overprovisioning strategy limits the logical address space, and as a result, reduces the number of valid pages in the victim block. Accordingly, there are more invalid pages in victim blocks when the flash memory is almost full. In GFTL and RFTL, once the logical block is full, the partial garbage collection is triggered in spite of the fact that there may exist many free blocks belonging to other logical blocks. The early garbage collection reduces the chances of invalidating the page on handling the data request in the future. As shown in FIG. 9, GFTL and RFTL have a large number of valid page copies, while pure-page-level scheme, RTGC and the present scheme have very low valid page copies overhead. The pure-page-level scheme, RTGC and the present scheme all implement page-level mapping scheme. Compared to pure-page-level scheme, both RTGC and the present scheme archives fewer number of valid page copies by implementing over-provisioning.

Figure 10:
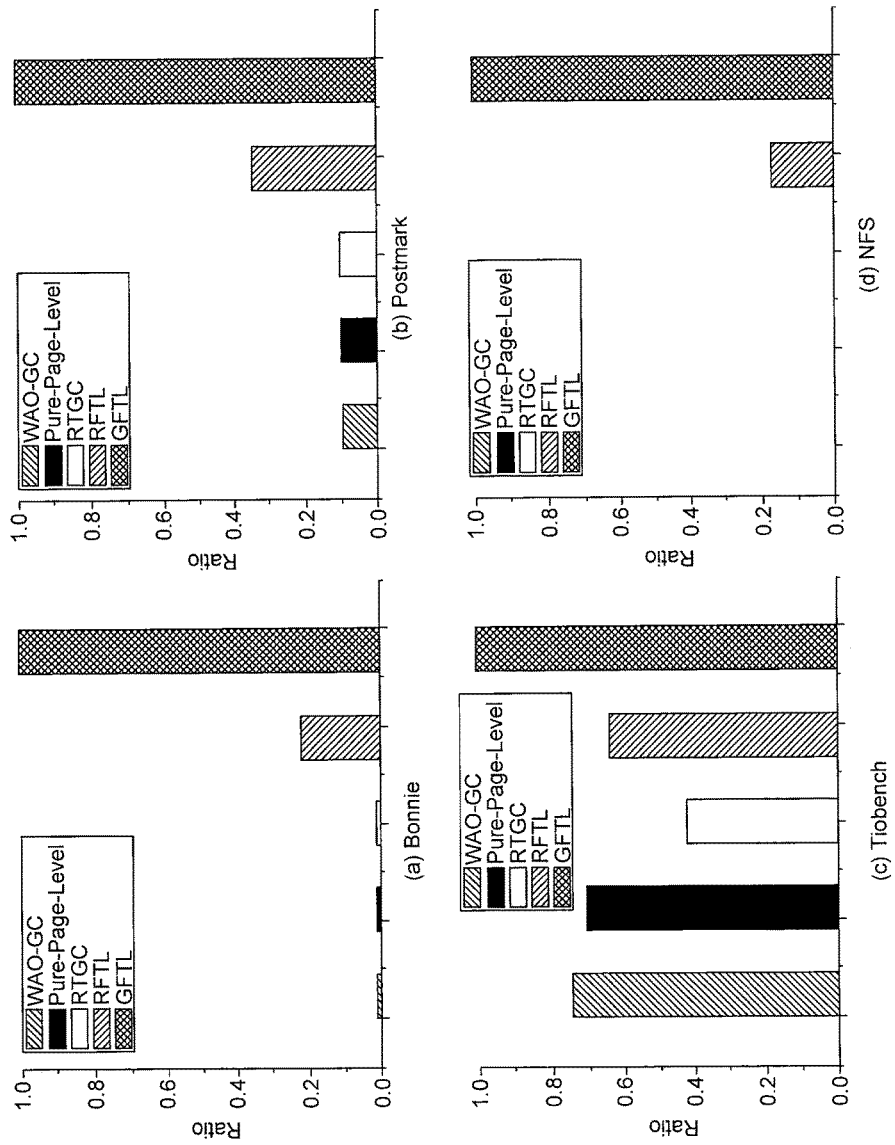
FIG. 10 are bar charts comparing the normalized number of block erase counts of WAO-GC with the normalized number of block erase counts of pure-page-level, RTGC, GFTL and RFTL in accordance with some embodiments of the present disclosure.

FIG. 10 are bar charts comparing the normalized number of block erase counts of WAO-GC with the normalized number of block erase counts of pure-page-level, RTGC, GFTL and RFTL in accordance with some embodiments of the present disclosure. The number of block erases influences the average system response time and the endurance of the NAND flash memory. As shown in the FIG. 10, compared to GFTL and RFTL, the present scheme significantly reduces 50.08% and 71.64% block erase counts respectively. The reason is because, for centralized partial garbage collection policy in GFTL and distributed partial garbage collection policy in RFTL, the condition for triggering garbage collection depends on the usage of logical blocks. There is a large number of unnecessary garbage collection operations in these schemes. Since RTGC reduces the logical address space to guarantee the reclaimed free space, RTGC archives lower block erase counts compared to pure-page-level scheme. According to some embodiments, the number of block erase counts of the present scheme is very close to that of RTGC.

Figure 11:
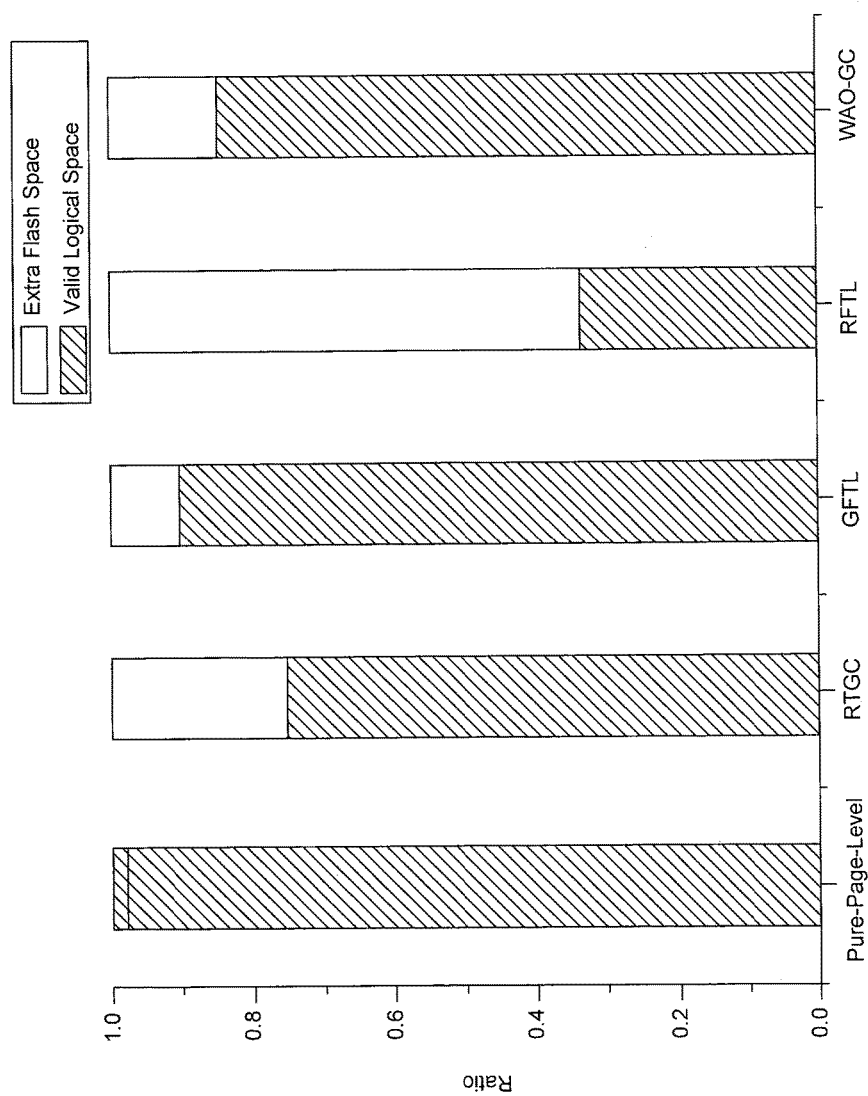
FIG. 11 is a bar chart comparing the space utilization ratio of WAO-GC with the space utilization ratio of pure-pagelevel, RTGC, GFTL and RFTL in accordance with some embodiments of the present disclosure.

FIG. 11 is a bar chart comparing the space utilization ratio of WAO-GC with the space utilization ratio of pure-page-level, RTGC, GFTL and RFTL in accordance with some embodiments of the present disclosure. In order to provide deterministic garbage collection and optimizing average performance, both the present scheme and previous schemes cost extra flash space as the write buffer or using for over-provisioning. According to some embodiments, the RAM space overheads are different for different address mapping schemes. The present scheme can reach close to the space utilization ratio a according to the space configuration. According to some embodiments, in the experiment as shown in FIG. 11, the space utilization is $U(\sigma)=((64-1)\times6)/((6+1)\times64)=84.38\%$, where $\alpha=6$. The present scheme costs about 15.62% flash space. In GFTL, there is a central write buffer to serve the upcoming write requests when implementing partial garbage collection. While in RFTL, there exists a distributed write buffer (i.e., buffer block) for each logical block. The buffer length in GFTL is limited by $N(k+1)/2$ so the flash space overhead is around 10.16%. RFTL pre-allocates three physical blocks to one logical block, thus it costs about 66.7% physical address space. For the reason that RTGC cannot get the real-time task information, according to some embodiments, set $\sigma=0.75$ as the ratio between the logical space and physical space. Pure-page-level scheme does not apply any optimizing mechanisms so the space utilization is close to 100%. Since the present scheme adopts page-level mapping scheme, the RAM overhead of the present scheme is larger than those adopting block-level or hybrid-level mapping schemes. In spite of the fact that the present scheme has physical space and RAM space cost, in addition to guaranteeing the serve time under worst case, the present scheme optimizes the average system latency compared to conventional approaches.

According to some embodiments, a method for partial garbage collection in a NAND flash storage system is disclosed. The method includes receiving a real time data request task in a NAND flash storage system; executing the real time data request task in the NAND flash storage system; determining a condition whether a number of free pages in the NAND flash storage system is below a pre-determined threshold; for the condition that the number of free pages in the NAND flash storage system is below a pre-determined threshold, determining whether a partial garbage collection list is empty; for the condition that the partial garbage collection list is empty, selecting a victim block from a plurality of blocks in the NAND flash storage system; creating partial garbage collection tasks in the NAND flash storage system; and putting the partial garbage collection tasks in the partial garbage collection list.

According to some embodiments, the method also includes selecting a partial garbage collection task from the partial garbage collection list; executing the selected partial garbage collection task; removing the executed partial garbage collection task from the partial garbage collection list; releasing the real time data request task.

According to some embodiments, for the condition that the number of free pages in a NAND flash storage system is not below a threshold, the method also includes releasing the real time data request task.

According to some embodiments, for the condition that the partial garbage collection list is not empty, the method also includes selecting one partial garbage collection task; executing the selected partial garbage collection task; removing the executed partial garbage collection task from the partial garbage collection list; and releasing the real time data request task.

According to some embodiments, a method for achieving joint worst-case and average-case optimization in a NAND flash storage system is disclosed. The method includes measuring a time to erase one block ($t_{er}$) in the NAND flash storage system; measuring a time to read one page for one page copy ($t_{rd}$) in the NAND flash storage system; measuring time to write one page for one page copy ($t_{wr}$) in the NAND flash storage system; and calculating the number of pages ($\alpha$) that can be finished in one partial step using $$\alpha = \left\lfloor \frac{t_{er}}{t_{rd}+t_{wr}} \right\rfloor.$$

According to some embodiments, the method also includes calculating the number of partial steps k needed to reclaim a victim block with λ valid pages in the NAND flash storage system using $$k = \left\lceil \frac{\lambda}{\alpha} \right\rceil + 1.$$

According to some embodiments, the method also includes determining a page number ($\pi$) in one block in the NAND flash storage system using $k+\lambda\le\pi$. According to some embodiments, the method also includes mapping a physical space in the NAND flash storage system to a logical space, wherein Λ represents the number of logical pages and N represents the number of total number of data pages in the NAND flash storage system. According to some embodiments, the method also includes calculating a ratio ($\sigma$) between a logic space and a physical space, wherein $\sigma=\Lambda/N$.

According to some embodiments, the method also includes determine an upper bound of the ratio (σ) using $$U(\sigma) = \frac{(\pi-1)\alpha}{(\alpha+1)\pi}.$$

According to some embodiments, the method also includes determining an upper bound of a number of valid pages λ in the NAND flash storage system using $U(\lambda)=\lceil \sigma \times \pi \rceil$.

According to some embodiments, a system is disclosed. The system includes a benchmarks module for hosting a plurality of benchmarks; an application module for hosting a plurality of applications; a file system module for hosting a plurality of file systems; and a lower device driver module. According to some embodiments, the lower device driver module further includes a flash translation layer module and a memory technology device layer. According to some embodiments the file system module further includes a virtual file system and buffer cache.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for achieving joint worst-case and average-case optimization in a NAND flash storage system, comprising:
    measuring a time to erase one block (ter) in the NAND flash storage system;
    measuring a time to read one page for one page copy (trd) in the NAND flash storage system;
    measuring time to write one page for one page copy (twr) in the NAND flash storage system;
    calculating the number of pages (α) that can be finished in one partial step of garbage collection using $$\alpha = \left\lfloor \frac{t_{er}}{t_{rd}+t_{wr}} \right\rfloor;$$

and
    executing garbage collection in the NAND flash storage system to reclaim space based on the number of pages α, when the number of free blocks in the NAND flash storage system is less than or equal to a pre-determined threshold.

2. The method of claim 1, wherein executing the garbage collection comprises:
    calculating the number of partial steps k needed to reclaim a victim block with λ valid pages in the NAND flash storage system using $$k = \left\lceil \frac{\lambda}{\alpha} \right\rceil + 1;$$

and
    executing each of the k partial steps of garbage collection to reclaim the victim block, wherein the pre-determined threshold is one.

3. The method of claim 2, further comprises:
    determining a page number (π) in one block in the NAND flash storage system using $k+\lambda \leq \pi$.

4. The method of claim 3, further comprises:
    mapping a physical space in the NAND flash storage system to a logical space, wherein Λ represents the number of logical pages and N represents the number of total number of data pages in the NAND flash storage system.

5. The method of claim 4, further comprises:
    calculating a ratio (σ) between a logic space and a physical space, wherein σ=Λ/N.

6. The method of claim 5, further comprises:
    determine an upper bound of the ratio (σ) using $$U(\sigma) = \frac{(\pi-1)\alpha}{(\alpha+1)\pi}.$$

7. The method of claim 6, further comprises:
    determining an upper bound of a number of valid pages λ in the NAND flash storage system using $U(\lambda)=\lceil \sigma \times \pi \rceil$.

8. The method of claim 1, wherein executing garbage collection comprises:
    receiving a real time data request task in the NAND flash storage system;
    executing the real time data r task in the NAND flash storage system;
    determining a condition whether a number of free pages in the NAND flash storage system is below a pre-determined threshold;
    for the condition that the number of free pages in the NAND flash storage system is below a pre-determined threshold, determining whether a partial garbage collection list is empty; and
    for the condition that the partial garbage collection list is empty,
        selecting a victim block from a plurality of blocks in the NAND flash storage system,
        creating partial garbage collection tasks to be performed to reclaim space in the NAND flash storage system, and
        putting the partial garbage collection tasks in the partial garbage collection list.

9. The method of claim 8, further comprises:
    selecting a partial garbage collection task from the partial garbage collection list.

10. The method of claim 9, further comprises:
    executing the selected partial garbage collection task.

11. The method of claim 10, further comprises:
    removing the executed partial garbage collection task from the partial garbage collection list.

12. The method of claim 11, further comprises:
    releasing the real time data request task.

13. The method of claim 8, wherein for the condition that the number of free pages in the NAND flash storage system is not below a threshold, further comprises:
    releasing the real time data request task.

14. The method of claim 8, wherein for the condition that the partial garbage collection list is not empty, further comprises:
    selecting one partial garbage collection task.

15. The method of claim 14, further comprises:
executing the selected partial garbage collection task.

16. The method of claim 15, further comprises:
removing the executed partial garbage collection task from the partial garbage collection list; and
releasing the real time data request task.

17. A system, comprising:
a benchmarks module for hosting a plurality of benchmarks;
an application module for hosting a plurality of applications;
a file system module for hosting a plurality of file systems; and
a lower device driver module comprising a flash translation layer module, wherein the flash translation layer module maps requests from the file system module to a NAND flash storage system and comprises a garbage collector configured to:
measure a time to erase one block (ter) in the NAND flash storage system,
measure a time to read one page for one page copy (trd) in the NAND flash storage system,
measure time to write one page for one page copy (twr) in the NAND flash storage system,
calculate the number of pages ($\alpha$) that can be finished in one partial step of garbage collection using ter, trd and twr, and
execute garbage collection in the NAND flash storage system to reclaim space based on the number of pages $\alpha$, when the number of free blocks in the NAND flash storage system is less than or equal to a pre-determined threshold.

18. The system of claim 17, wherein the pre-determined threshold is one.

19. The system of claim 17, wherein the lower device driver module further comprises:
a memory technology device layer.

20. The system of claim 17, wherein the file system module further comprises:
a virtual file system and buffer cache.

* * * * *